US 9,001,253 B2

(12) United States Patent
Maeda

(10) Patent No.: US 9,001,253 B2
(45) Date of Patent: Apr. 7, 2015

(54) MOBILE TERMINAL AND IMAGING KEY CONTROL METHOD FOR SELECTING AN IMAGING PARAMETER VALUE

(71) Applicant: KYOCERA Corporation, Kyoto-shi, Kyoto (JP)

(72) Inventor: Takashi Maeda, Shijonawate (JP)

(73) Assignee: KYOCERA Corporation, Kyoto (JP)

( * ) Notice: Subject to any disclaimer, the term of this patent is extended or adjusted under 35 U.S.C. 154(b) by 65 days.

(21) Appl. No.: 13/772,064

(22) Filed: Feb. 20, 2013

(65) Prior Publication Data

US 2013/0215313 A1 Aug. 22, 2013

(30) Foreign Application Priority Data

Feb. 21, 2012 (JP) ................................. 2012-034703

(51) Int. Cl.
*H04N 5/222* (2006.01)
*H04N 5/232* (2006.01)

(52) U.S. Cl.
CPC ......... *H04N 5/23216* (2013.01); *Y10S 715/974* (2013.01)

(58) Field of Classification Search
USPC ............................ 348/333.02, 333.04, 333.11
See application file for complete search history.

(56) References Cited

U.S. PATENT DOCUMENTS

| | | | | |
|---|---|---|---|---|
| 8,670,060 | B2* | 3/2014 | Jones et al. | 348/333.01 |
| 2006/0044285 | A1* | 3/2006 | Sato et al. | 345/173 |
| 2007/0097246 | A1* | 5/2007 | Adams | 348/333.01 |
| 2008/0267607 | A1* | 10/2008 | Mori | 396/374 |
| 2011/0221948 | A1* | 9/2011 | Saito | 348/333.01 |
| 2011/0242395 | A1* | 10/2011 | Yamada et al. | 348/333.02 |
| 2011/0292268 | A1* | 12/2011 | Mann et al. | 348/333.01 |
| 2012/0030634 | A1* | 2/2012 | Miyazaki | 715/863 |
| 2012/0030636 | A1* | 2/2012 | Miyazaki et al. | 715/863 |
| 2012/0084739 | A1* | 4/2012 | Sirpal et al. | 715/863 |
| 2013/0083222 | A1* | 4/2013 | Matsuzawa et al. | 348/240.3 |
| 2014/0049677 | A1* | 2/2014 | Kawaguchi | 348/333.01 |
| 2014/0098273 | A1* | 4/2014 | Ito et al. | 348/333.03 |

FOREIGN PATENT DOCUMENTS

JP 2010-204844 A 9/2010

* cited by examiner

*Primary Examiner* — Ngoc-Yen Vu
(74) *Attorney, Agent, or Firm* — Procopio, Cory, Hargreaves & Savitch LLP

(57) ABSTRACT

A mobile phone comprises a display, etc. If a camera function is performed, a through image (preview image) based on an imaging parameter value, a shutter key, etc. are displayed on the display. A RAM is registered in advance with imaging parameter value brought into correspondence to a coordinates range. When a predetermined time period elapses after a touch operation is made to the shutter key, an auxiliary key corresponding to the coordinates range is displayed. If a user moves a finger into the coordinates range based on the displaying of the auxiliary key, a current imaging parameter value is changed to a registered imaging parameter value. If the finger is released in such a state, an image imaged based on a changed imaging parameter value.

12 Claims, 12 Drawing Sheets

FIG. 8
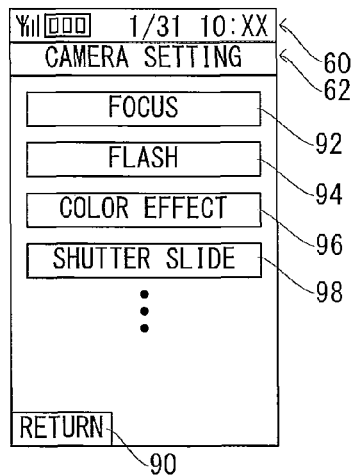
FIG. 9
(A)
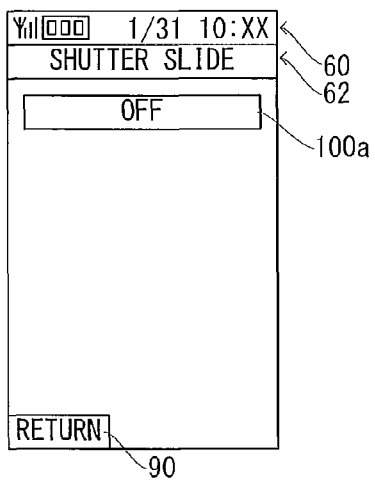
(B)
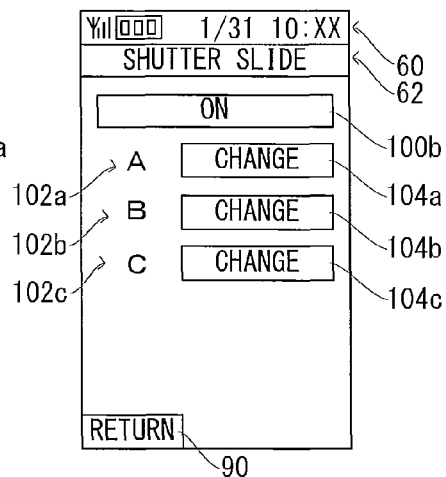
(C)
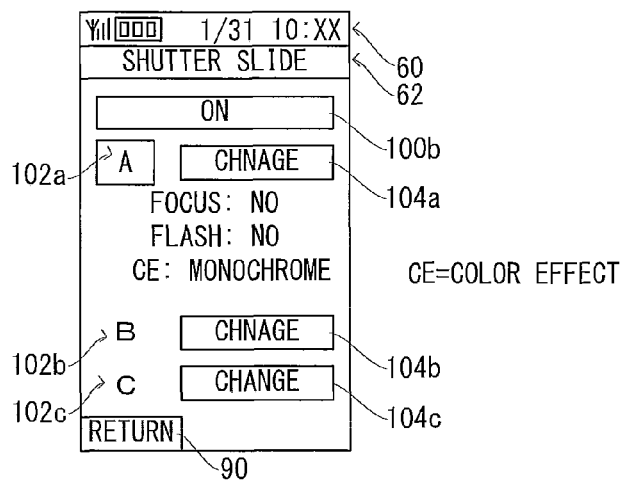
CE=COLOR EFFECT FIG. 10 (A) (B)
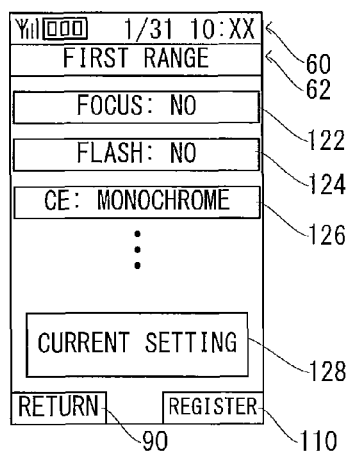
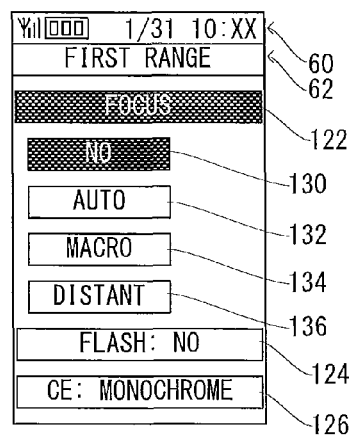
(C)
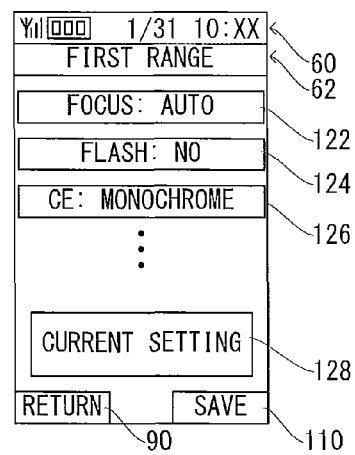
FIG. 11
IMAGING PARAMETER VALUE TABLE
| RANGE | IMAGING PARAMETER VALUES | | | | AUXILIARY KEY |
|---|---|---|---|---|---|
| | FOCUS | FLASH | COLOR EFFECT (CE) | ... | |
| FIRST RANGE $Y > a_1 X + b_1, Y \geq a_2 X + b_2$ | AUTO | NO | NEGATIVE | ... | FIRST |
| SECOND RANGE $Y < a_2 X + b_2, Y \geq a_3 X + b_3$ | MACRO | AUTO | NORMAL | ... | SECOND |
| THIRD RANGE $Y < a_3 X + b_3, Y \geq a_4 X + b_4$ | DISTANT | ON | SEPIA | ... | THIRD |

MOBILE TERMINAL AND IMAGING KEY CONTROL METHOD FOR SELECTING AN IMAGING PARAMETER VALUE

CROSS REFERENCE OF RELATED APPLICATION

The disclosure of Japanese Patent Application No. 2012-34703 is incorporated herein by reference.

BACKGROUND OF THE INVENTION

1. Field of the Invention

The present invention relates to a mobile terminal and an imaging key control method, and more specifically, a mobile terminal capable of imaging an image and an imaging key control method.

2. Description of the Related Art

An example of a mobile terminal capable of imaging an image is disclosed in Japanese Patent Application Laying-Open No. 2010-204844 [G06F 3/048, H04N 5/225, G06F 3/041, H04M 1/247] laid-open on Sep. 16, 2010. A first group of icons indicating kinds (parameters) of an operating condition are displayed on a display portion of a digital camera in this related art. If a drag operation is performed to an arbitrary first icon and the drag operation is determined as a second operation, a plurality of second icons corresponding to choices of the parameters and a cursor for selecting any one of the second icons are newly displayed. In addition, if the drag operation determined as the second operation is continuously performed, the second icon to be selected by the cursor is changed. Then, it is possible for a user to change the parameter corresponding to the second icon by ending the second operation in a state that a desired second icon is being selected.

However, the digital camera of the related art is poor in operability. Therefore, it takes time to change the parameters for the imaging scene.

SUMMARY OF THE INVENTION

Therefore, a mobile terminal and an imaging key control method, capable of increasing operability when imaging are desirable for user.

A first aspect according to the present invention is a mobile terminal which has a camera module and in which a first imaging parameter value is set prior to imaging, comprising: a display module; a touch panel provided on the display module; a detecting module which detects a touch operation to the touch panel; a storing module which stores a condition of the touch operation in correspondence to at least one second imaging parameter value being registered in advance; a displaying processing module which displays an imaging key on the display module; a determining module which determines, when a touch operation is performed to the imaging key, whether or not the touch operation satisfies the condition; a changing module which changes the first imaging parameter value to the second imaging parameter value when it is determined that the touch operation to the imaging key satisfies the condition; and a saving module which saves an image imaged based on the second imaging parameter value by the camera module when the touch operation to the imaging key is ended.

A second aspect according to the present invention is a non-transitory computer readable storage medium which stores an imaging key controlling program executable by a processor in a mobile terminal in which a first imaging parameter value is set prior to imaging and which includes a camera module, a display module, a touch panel provided on the display module, a detecting module which detects a touch operation to the touch panel and a storing module which stores a condition of the touch operation in correspondence to at least one second imaging parameter value being registered in advance, wherein the imaging key controlling program causes the processor to function as: a displaying processing module which displays an imaging key on the display module; a determining module which determines, when a touch operation is performed to the imaging key, whether or not the touch operation satisfies the condition; a changing module which changes the first imaging parameter value to the second imaging parameter value when it is determined that the touch operation to the imaging key satisfies the condition; and a saving module which saves an image imaged based on the second imaging parameter value by the camera module when the touch operation to the imaging key is ended.

A third aspect according to the present invention is an imaging key control method in a mobile terminal in which a first imaging parameter value is set prior to imaging and which has a camera module, a display module, a touch panel provided on the display module, a detecting module which detects a touch operation to the touch panel and a storing module which stores a condition of the touch operation in correspondence to at least one second imaging parameter value being registered in advance, comprising steps of: displaying an imaging key on the display module; determining, when a touch operation is performed to the imaging key, whether or not the touch operation satisfies the condition; changing the first imaging parameter value to the second imaging parameter value when it is determined that the touch operation to the imaging key satisfies the condition; and saving an image imaged based on the second imaging parameter value by the camera module when the touch operation to the imaging key is ended.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 1(A) shows an appearance of a main surface of the mobile phone and FIG. 1(B) shows an appearance of another surface of the mobile phone.

FIG. 4(A) shows an example of a state that a shutter key is being touched, and FIG. 4(B) shows an example of a state that an auxiliary key is being displayed as a result that the shutter key is touched.

FIG. 6(A) shows an example of a through image that a color is reversed, and FIG. 6(B) shows an example of a through image in a state that a focus position is set in macro.

FIG. 8 is an illustrative view showing an example of a menu screen displayed on the display shown in FIG. 1.

FIG. 9 is an illustrative view showing an example of a setting screen displayed on the display shown in FIG. 1, FIG. 9(A) is an example of the setting screen at a time that a shutter slide function is made ineffective, FIG. 9(B) is an example of the setting screen at a time that a shutter slide function is made effective, and FIG. 9(C) is another example of the setting screen at a time that a shutter slide function is made effective.

FIG. 10 is an illustrative view showing an example of a changing screen displayed on the display shown in FIG. 1, FIG. 10(A) shows an example of an imaging parameter value corresponding to the coordinates range shown in FIG. 5, FIG. 10(B) shows a list of imaging parameter values of a focus shown in FIG. 10(A), and FIG. 10(C) shows another example of the imaging parameter value corresponding to the coordinates range shown in FIG. 5.

FIG. 11 is an illustrative view showing an example of structure of an imaging parameter value table stored in a RAM shown in FIG. 2.

FIG. 19(A) shows an example of a through image in a state that a touch operation is not performed, and FIG. 19(B) shows another example of a state that the shutter key is being touched.

DETAILED DESCRIPTION OF THE PREFERRED EMBODIMENTS

Figure 1:
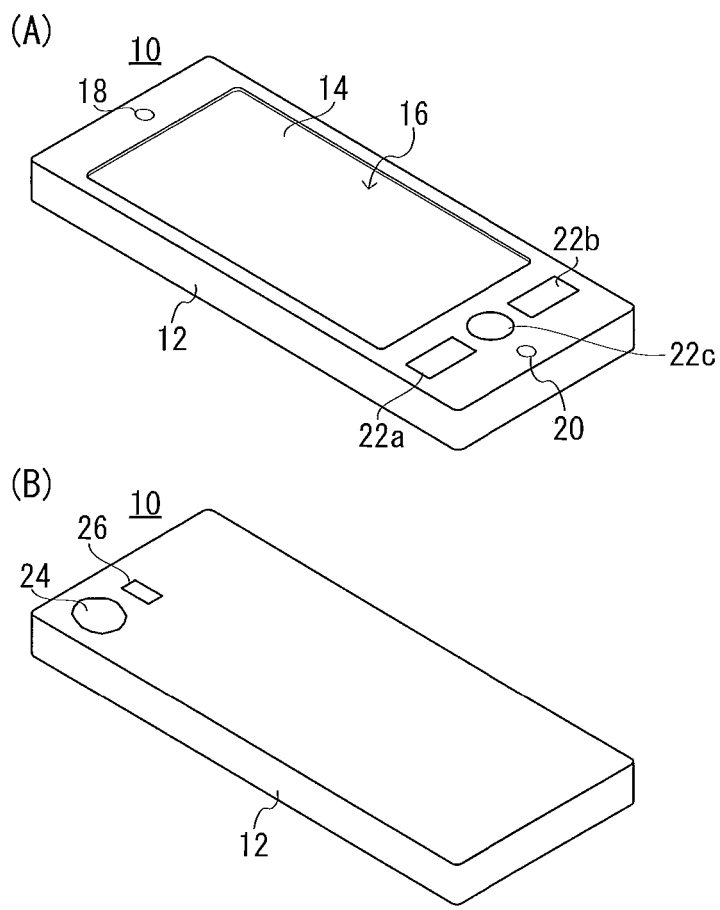
FIG. 1 is an appearance view showing a mobile phone of an embodiment according to the present invention.

With referring to FIG. 1, a mobile phone 10 of an embodiment according to the present invention is a so-called smartphone, and includes a longitudinal flat rectangular housing 12. However, it is pointed in advance that the present invention can be applied to an arbitrary mobile terminal such as a tablet terminal, a PDA, etc.

A display 14 of a liquid crystal, organic EL or the like, which functions as a display module, is provided on a main surface (front surface) of the housing 12. A touch panel 16 is provided on the display 14. Therefore, in the mobile phone 10 of this embodiment, the most part of an input operation excepting an input by an operation of a hardware key described later is performed through the touch panel 16.

A speaker 18 is housed in the housing 12 at one end of a longitudinal direction on a side of the main surface, and a microphone 20 is housed at the other end in the longitudinal direction on the side of the front surface.

As a hard key constituting an input operating module together with the touch panel 16, a call key 22a, an end key 22b and a menu key 22c are provided.

For example, the user can input a telephone number by making a touch operation on the touch panel 16 with respect to a dial key (not shown) displayed on the display 14, and start a telephone conversation by operating the call key 22a. If and when the end key 22b is operated, the telephone conversation can be ended. In addition, by long-depressing the end key 22b, it is possible to turn-on/-off power of the mobile phone 10.

If the menu key 22c is operated, a menu screen is displayed on the display 14, and in such a state, by making a touch operation on the touch panel 16 with respect to a soft key, a menu icon (both, not shown) or the like being displayed on the display 14, it is possible to select a menu and to determine such a selection.

A lens aperture 24 and an LED 26 for a camera module 50 (FIG. 2) are provided at another side on the one end of the longitudinal direction. Therefore, the camera module 50 can image an object irradiated by a light-emitting (flash) of the LED 26 through the lens aperture 24. In addition, there is an occasion that the LED 26 does not emit a light at a time of imaging.

Figure 2:
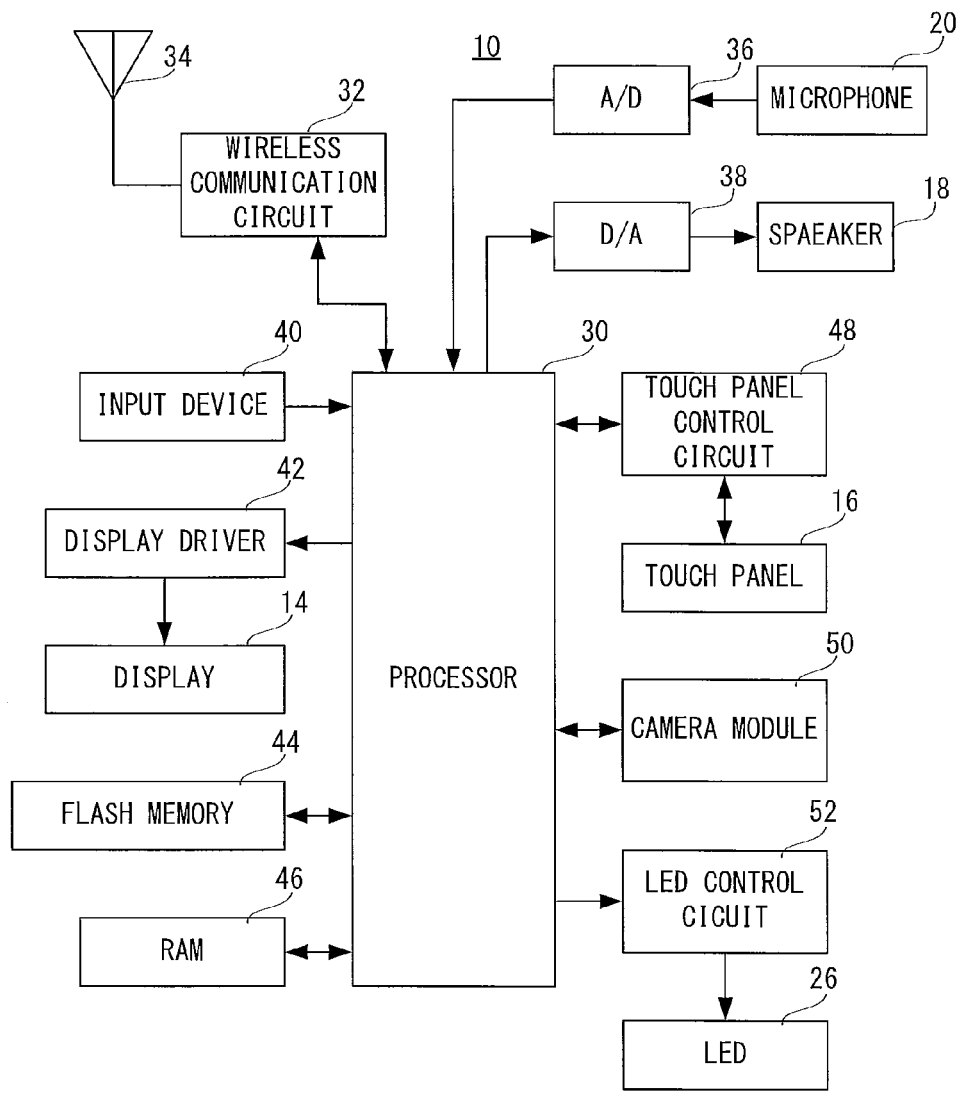
FIG. 2 is a view showing electrical structure of the mobile phone shown in FIG. 1.

With referring to FIG. 2, the mobile phone 10 of the embodiment shown in FIG. 1 includes a processor 30 called as a computer or a CPU. The processor 30 is connected with a wireless communication circuit 32, an A/D converter 36, a D/A converter 38, an input device 40, a display driver 42, a flash memory 44, a RAM 46, a touch panel control circuit 48, the camera module 50, an LED control circuit 52, etc.

The processor 30 is in charge of a whole control of the mobile phone 10. All or a part of a program set in advance in the flash memory 44 is, in use, developed or loaded into the RAM 46 functioning as a storing module, and the processor 30 performs various kinds of processing in accordance with the program developed in the RAM 46. In addition, the RAM 46 is further used as a working area or buffer area for the processor 30.

The input device 40 includes the touch panel 16 and the hard keys 22 both shown in FIG. 1, and constitutes an operating module or an inputting module. Information (key data) of the hard key user operated is input to the processor 30.

The wireless communication circuit 32 is a circuit for transmitting and receiving a radio wave for a telephone conversation, a mail, etc. via an antenna 34. In this embodiment, the wireless communication circuit 32 is a circuit for performing a wireless communication with a CDMA system. For example, if the user designates an outgoing call (telephone call) using the input device 40, the wireless communication circuit 32 performs a telephone call processing under instructions from the processor 30 and outputs a telephone call signal via the antenna 34. The telephone call signal is transmitted to a telephone at the other end of the line through a base station and a communication network. Then, when an incoming call processing is performed in the telephone at the other end of the line, a communication-capable state is established and the processor 30 performs the telephonic communication processing.

Specifically describing a normal telephonic communication process, a modulated sound signal sent from a telephone at the other end of the line is received by the antenna 34. The modulated sound signal received is subjected to demodulation processing and decode processing by the wireless communication circuit 32. A received sound signal obtained through such processing is converted into a sound signal by the D/A converter 38 to be output from the speaker 18. On the other hand, a sending sound signal taken-in through the microphone 20 is converted into sound data by the A/D converter 36 to be applied to the processor 30. The sound data is subjected to encode processing and modulation processing by the wireless communication circuit 32 under instructions by the processor 30 to be output via the antenna 34. Therefore, the modulated sound signal is transmitted to the telephone at the other end of the line via the base station and the communication network.

When the telephone call signal from a telephone at the other end of the line is received by the antenna 34, the wireless communication circuit 32 notifies the processor 30 of the incoming call. In response thereto, the processor 30 displays on the display 14 sender information (telephone number and so on) described in the incoming call notification by controlling the display driver 42. In addition, the processor 30 outputs from the speaker 18 a ringtone (may be also called as a ringtone melody, a ringtone voice).

Then, if the user performs an answering operation by using the call key 22a (FIG. 1) displayed included in the input device 40, the wireless communication circuit 32 performs processing for establishing a communication-capable state under instructions by the processor 30. Furthermore, when the communication-capable state is established, the processor 30 performs the above-described telephone communication processing.

If the telephone communication ending operation is performed by the end key 22b (FIG. 1) included in the input device 40 after a state is changed to the communication-capable state, the processor 30 transmits a telephone communication ending signal to the telephone at the other end of the line by controlling the wireless communication circuit 32. Then, after the transmission of the telephone communication ending signal, the processor 30 terminates the telephone conversation processing. Furthermore, in a case that the telephone communication ending signal from the telephone at the other end of the line is received before the telephone conversation ending operation at this end, the processor 30 also terminates the telephone conversation processing. In addition, in a case that the telephone conversation ending signal is received from the mobile communication network not from the telephone at the other end of the line, the processor 30 also terminates the telephone conversation processing.

The microphone 20 shown in FIG. 1 is connected to the A/D converter 36, and as described above, a sound signal from the microphone 20 is input to the processor 30 as digital sound signal through the A/D converter 36. The speaker 18 is connected to the D/A converter 38. The D/A converter 38 converts digital sound data into an analog sound signal so as to apply to the speaker 18 via an amplifier. Therefore, a sound or voice of the sound data is output from the speaker 18.

In addition, the processor 30 adjusts, in response to an operation for adjusting a volume by the user, a sound volume of the sound output from the speaker 18 by controlling an amplification factor of the amplifier connected to the D/A converter 38.

The display driver 42 is connected to the display 14 and the processor 30 to store image data output from the processor 30 into a VRAM. Then, the display driver 42 displays an image corresponding to the data in the VRAM on the display 14. In other words, the display driver 42 controls a displaying by the display 14 which is connected to the display driver 40 under instructions by the processor 30. In addition, the display 14 is provided with a backlight which includes a light source of an LED or the like, for example, and the display driver 42 controls, according to the instructions from the processor 30, brightness, light-on/-off of the backlight.

The touch panel 16 shown in FIG. 1 is connected to a touch panel control circuit 48. The touch panel control circuit 48 applies to the touch panel 16 a necessary voltage or the like and inputs to the processor 30 a touch start signal indicating a start of a touch by the user to the touch panel 16, a touch end signal indicating an end of a touch by the user, and coordinates data (touch coordinates data) indicating a touch position that the user touches. The processor 30 can determine which icon or key is touched by the user based on the coordinates data input from the touch pane control circuit 48.

In the embodiment, the touch panel 16 is of an electrostatic capacitance system that detects a change of an electrostatic capacitance between electrodes, which occurs when an object such as a finger is in close to a surface of the touch panel 16, and it is detected that one or more fingers are brought into contact with the touch panel 16, for example. Furthermore, the touch panel 16 is provided on the display 14, and serves as a pointing device for designating an arbitrary position within the screen. The touch panel control circuit 48 functions as a detecting module for detecting a touch operation, and, more specifically, detects a touch operation within a touch-effective range of the touch panel 16, and outputs coordinates data indicative of a position of the touch operation to the processor 30. That is, the user inputs to the mobile phone 10 an operation position, an operation direction and so on through a touch, slide or release operation on the surface of the touch panel 16.

In addition, for a detection system of the touch panel 16, a surface-type electrostatic capacitance system may be adopted, or a resistance film system, an ultrasonic system, an infrared ray system, an electromagnetic induction system or the like may be adopted. Furthermore, a touch operation is not limited to an operation by a finger, may be performed by a touch pen.

A camera module 50 includes a control circuit, a lens, an image sensor, etc. The processor 30 activates the camera module 50 when an operation for performing a camera function is made, and displays a through image (preview image) corresponding to a background and an object on the display 14. Then, the camera module 50 performs processing for imaging an image if and when a user performs an imaging operation.

An LED control circuit 52 controls a light-emitting of the LED 26 connected to the LED control circuit 52 under instructions by the processor 30. Furthermore, in a case that the camera function is performed, there is an occasion that the LED 26 emits a light as a flash. In addition, the LED control circuit 52 and the LED 26 may be called as a light-emitting module.

Figure 3:
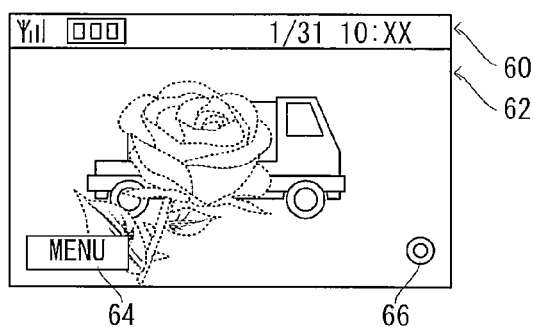
FIG. 3 is an illustrative view showing an example of a through image (preview image) displayed on a display shown in FIG. 1.

FIG. 3 is an illustrative view showing an example of a through image displayed on the display 14. A displaying range of the display 14 includes a status displaying area 60 and a function displaying area 62. In the status displaying area 60, an icon (picto) representative of a radio wave reception state by the antenna 34, an icon representative of a residual battery capacity of the secondary battery and a day and time are displayed. In the function displaying area 62, a menu key 64 for displaying a menu screen and a shutter key (may be called as an imaging key) 66 for performing an imaging operation are displayed. If and when the camera function is performed, a through image is displayed based on an imaging parameter value. If the user performs a touch operation to the menu key 64, for example, a menu screen (see FIG. 8) for changing the imaging parameter value such as a focus, a flash, a color effect, etc. is displayed. Then, it is possible for the user to change these imaging parameter values by operating a GUI in the menu screen.

"Imaging parameter value" is a parameter value showing an imaging condition of an image. The imaging parameter value of this embodiment shown includes imaging parameter values such as a focus, a flash, a color effect, etc.

An imaging parameter value of the focus includes "NO" that an automatically focusing process is not performed, "AUTO" that the automatically focusing process is performed, "MACRO" that a focus position of a focus lens is fixed in a close-range view (macro), and "DISTANT" that the focus position of a focus lens is fixed in a distant view. An imaging parameter value of the flash includes "ON" that the LED 26 surely emits a light as a flash, "NO" that the LED 26 does not emit a light as the flash, "AUTO" that the light-emitting of the LED 26 is determined based on an environmental light amount, and "RED-EYE" that the LED 26 emits a light such that a red-eye of the object can be suppressed. The imaging parameter value of the color effect includes "STANDARD" that a color of an image to be imaged is rendered in a normal color tone, "SEPIA" that a color of an image to be imaged is rendered in a sepia tone, "MONOCHROME" that a color of an image to be imaged is rendered in a monochrome tone, and "NEGATIVE" that a color of an image to be imaged is to be reversed.

Then, it is possible for the user to image an image to which change(s) of the imaging parameter value(s) is reflected by setting these imaging parameter values prior to imaging and then operating the shutter key 66.

Here, the mobile phone 10 of this embodiment has a shutter slide function. The shutter slide function means a function changing current imaging parameter value (first imaging parameter value) to an imaging parameter value being registered in advance (second imaging parameter value) if and when a touch operation satisfying a predetermined condition is performed to the shutter key 66. Then, when the user ends the touch operation satisfying the predetermined condition, based on changed imaging parameter value(s), an image is imaged. In the following, the shutter slide function is described more specifically.

Figure 4:
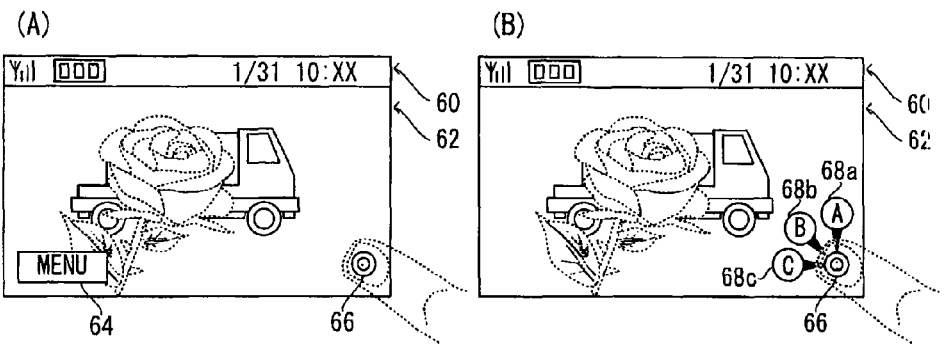
FIG. 4 is an illustrative view showing an example of a touch operation performed to a touch panel shown in FIG. 1.

With referring to FIGS. 4(A) and 4(B), if a predetermined time period (3 seconds, for example) elapses after the shutter key 66 is touched, the auxiliary key 68 is displayed around the shutter key 66 and the displaying of the menu key 64 is non-displayed. Then, three auxiliary key 68 indicate to the user a predetermined condition for changing the imaging parameter value. That is, it becomes easy for the user to change the imaging parameter value by referring to the displaying of the auxiliary key 68. Furthermore, by the displaying of the auxiliary key 68, a coordinates range A described later becomes easy to be grasped. In addition, in FIG. 4(B), three auxiliary keys 68 are displayed, but in other embodiments, two or less auxiliary keys 68 or four more auxiliary keys 68 may be displayed.

Figure 5:
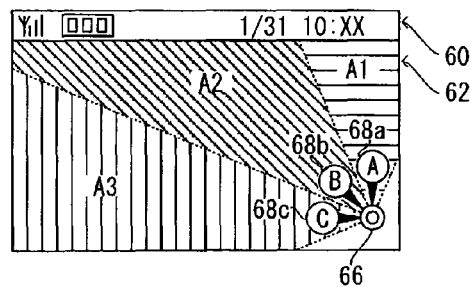
FIG. 5 is an illustrative view showing an example of a coordinates range set within a touch range of the touch panel shown in FIG. 1.

With referring to FIG. 5, the above-described predetermined condition includes a condition whether or not the touch position of the touch operation is included in the coordinates range A, and each of the coordinates ranges A is brought into correspondence to each of the auxiliary keys 68. For example, a coordinates range A1 corresponds to a first auxiliary key 68a, a coordinates range A2 corresponds to a second auxiliary key 68b, and a coordinates range A3 corresponds to a third auxiliary key 68c. Furthermore, the imaging parameter values of "NO" of the focus, "ON" of the flash and "NEGATIVE" of the color effect are registered with being associated with the coordinates range A1. The imaging parameter values of "MACRO" of the focus, "NO" of the flash and "MONOCHROME" of the color effect are registered in association with the coordinates range A2. In association with the coordinates range A3, "DISTANT" of the focus, "NO" of the flash and "STANDARD" of the color effect are registered. Then, in this embodiment, after the shutter key 66 is touched, based on the coordinates range A including the touch position, the imaging parameter value registered in advance is read.

Figure 6:
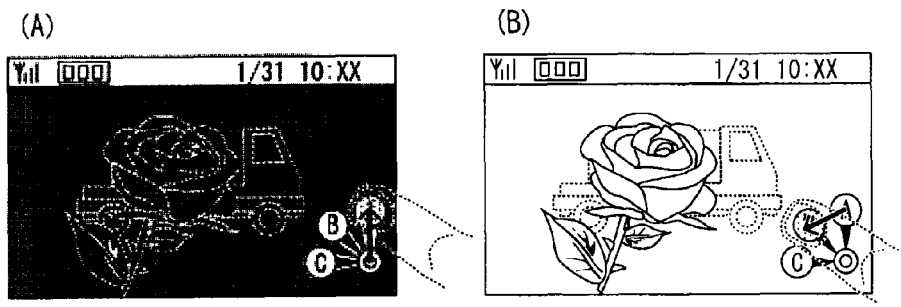
FIG. 6 is an illustrative view showing a further example of a through image displayed on the display shown in FIG. 1.

With referring to FIG. 6(A), if the user moves (slides) the touch position from the shutter key 66 to the first auxiliary key 68a, it is determined that the touch position enters the coordinates range A1 corresponding to the first auxiliary key 68a. In such a case, the imaging parameter value corresponding to the coordinates range A1 is read and the current imaging parameter value is changed to the imaging parameter value corresponding to the coordinates range A1. That is, respective imaging parameter values are changed to "NO" of the focus, "ON" of the flash and "NEGATIVE" of the color effect. Then, as a result that the imaging parameter value is changed, a through image to be displayed on the display 14 becomes a state that the color is reversed.

Furthermore, with referring to FIG. 6(B), if the user moves (slides) the touch position to the second auxiliary key 68b, it is determined that the touch position enters the coordinates range A2 corresponding to the second auxiliary key 68b. Accordingly, the imaging parameter value corresponding to the coordinates range A2 is read and the current imaging parameter value is changed to the imaging parameter value corresponding to the coordinates range A2. That is, the focus is changed to "MACRO", the flash is changed to "NO" and the color effect is changed to "MONOCHROME", and a through image which is focused to an object (flower) at the front end and in monochrome tone is displayed on the display 14.

In addition, in other embodiments, if the user moves the touch position to an arbitrary auxiliary key 68 out of three auxiliary keys 68, the auxiliary key 68 may be displayed with being emphasized. For example, in the other embodiments, when the user slides a touch position to the first auxiliary key 68a, the first auxiliary key 68a is displayed larger than other auxiliary keys 68b and 68c, or a character 'A' is displayed in a bold character, or displayed in a different color.

Thus, in this embodiment, the user can easily select the imaging parameter value only by moving the touch position to an arbitrary coordinates range A.

Then, if the user releases a finger from the touch panel 16 in a state that the imaging parameter value is changed, an image is imaged based on the changed imaging parameter value. For example, if the finger is released from the touch panel 16 in a state the touch position is changed to the second auxiliary key 68b, the imaging process is performed, and an image corresponding to FIG. 6(B) is imaged.

Figure 7:
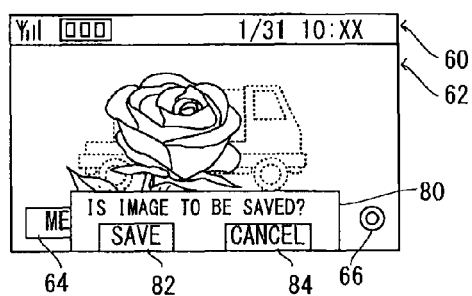
FIG. 7 is an illustrative view showing an example of a pop-up displayed on the display shown in FIG. 1.

With referring to FIG. 7, if the imaging process is performed, the menu key 64 is displayed again and the auxiliary key 68 is non-displayed. Then, a pop-up 80 for confirming whether or not an imaged image is to be saved is displayed. In this pop-up 80, a save key 82 and a cancel key 84 are included. At this time, the user can save image data corresponding to a displayed image to the flash memory 44 by performing a touch operation to the save key 82. Furthermore, it is possible for the user to return a state that a through image is displayed without saving the imaged image by performing the touch operation to the cancel key 84.

Therefore, the user can perform imaging with easily changing the imaging parameter value by only performing a predetermined touch operation when imaging. Therefore, operability in imaging can be increased.

Even if the touch position is moved to each coordinates range A prior to the auxiliary key 68 becoming to be displayed, the imaging parameter value is changed. Accordingly, the user can perform simultaneously changing the imaging parameter value and imaging by performing an operation rubbing the surface of the touch panel 16, i.e. flick operation to the shutter key 66 prior to the auxiliary key 68 becoming to be displayed. In a case of such an operation, a time from the imaging parameter value being changed to the imaging being performed is further shortened.

In addition, in other embodiments, the displaying position of the shutter key 66 on the display 14 may be arbitrarily set by the user. In such a case, the shutter key 66 is displayed at a position on the display 14 easy to be touched for the user.

Next, procedure for registering in advance an imaging parameter value for changing will be described. With referring to FIG. 8, if the menu key 64 is operated, the menu screen is displayed. In this menu screen, as a GUI, a return key 90, a focus key 92, a flash key 94, a color effect key 96 and a shutter slide key 98 are displayed. The return key 90 is a key for returning to a state that the through image is being displayed as shown in FIG. 3. The focus key 92, the flash key 94, and the color effect key 96 are keys for changing the respectively corresponding imaging parameter values. The shutter slide key 98 is a key for changing the setting of the shutter slide function.

With referring to FIGS. 9(A) and 9(B), if the shutter slide key 98 is operated, a setting screen is displayed. Here, if the shutter slide function is not made effective, in the setting screen, the return key 90 for returning to the menu screen of FIG. 8 and an ineffective key 100a indicative of an ineffective state are displayed. On the other hand, if the shutter slide function is made effective, in the setting screen, the return key 90 and an effective key 100b indicative of an effective state, and a character string 102 indicating the respective coordinates ranges A and changing keys 104 for changing the imaging parameter values brought into correspondence to the respective coordinates ranges A are displayed. A first character string 102a and a first changing key 104a correspond to the coordinates range A1, a second character string 102b and a second changing key 104b correspond to the coordinates range A2 and a third character string 102c and a third changing key 104c correspond to the coordinates range A3. In addition, the ineffective key 100a and the effective key 100b may be called as a switching key 100 collectively.

For example, if the touch operation is performed to the ineffective key 100a in the ineffective state, the shutter slide function becomes effective, and the screen is switched to the setting screen of FIG. 9(B). If the touch operation is performed to the effective key 100b in the effective state, the shutter slide function becomes ineffective, and the screen is switched to the setting screen of FIG. 9(A).

Furthermore, with referring to FIG. 9(C), if the touch operation is performed to an arbitrarily character string 102, the setting of the imaging parameter value at the current time is displayed. For example, in a case that the touch operation to the first character string 102a is performed, the imaging parameter values of the focus, the flash and the color effect are displayed between the first character string 102a, the first changing key 104a and the second character string 102b, the second changing key 104b. It is to be noted that in FIGS. 9(c) and 10(A) to 10(C), "CE" indicates "color effect".

With referring to FIG. 10(A), if the touch operation is performed to the first changing key 104a, for example, in FIGS. 9(B) and 9(C), the changing screen of the imaging parameter values related to the first coordinates range A1 is displayed on the display 14. In the changing screen, the return key 90, a registering key 110, a focus changing key 122, a flash changing key 124, a color effect changing key 126 and a reading key 128 are included.

The return key 90 is a key for returning to the setting screen. The registering key 110 is a key for registering the imaging parameter value changed in the changing screen in the imaging parameter value table (see FIG. 11). The focus changing key 122, the flash changing key 124 and the color effect changing key 126 are keys for changing registered contents of the respective imaging parameter values. For these keys, character strings indicative of the current imaging parameter values are written. Then, the reading key 128 is a key for reading the current imaging parameter value being set by the operation by the user or the like to reflect in the respective imaging parameter value. By utilizing this key, the user can easily register the imaging parameter value having been utilized until just before.

With referring to FIG. 10(B), in a case that the touch operation to the focus changing key 122 is performed, as the imaging parameter values of the focus, a "NO" key 130, an "AUTO" key 132, a "MACRO" key 134 and a "DISTANT" key 136 are further displayed. In addition, the displaying of the return key 90 and the registering key 110 is non-displayed in this state. Furthermore, in order to show that the focus changing key 122 is selected, a color thereof is reversed, and the "NO" key 130 is displayed in a state that a color thereof is reversed in order to show that this is an imaging parameter value being set at this point.

With referring to FIG. 10(C), if the touch operation is performed to the "AUTO" key 132, for example, an imaging parameter value of the focus is changed to "AUTO" and the character string written on the focus changing key 122 is changed to a character string of "AUTO". Then, if the touch operation is made to the registering key 110 in this state, the imaging parameter value of the focus is registered in the imaging parameter value table as "AUTO". That is, the user can arbitrarily register the imaging parameter value; however, if the return key 90 is operated while the registering key 110 is not operated, the changing result is not registered and discarded.

In addition, in a case that the flash changing key 124 or the color effect changing key 126 is operated, keys showing corresponding imaging parameter values are similarly displayed. The processing of a case that the key corresponding to other imaging parameter value is operated is substantially similar to a case that the "AUTO" key 132 is operated, and therefore, a detailed description is omitted.

FIG. 11 is an illustrative view showing details of the imaging parameter value table. The imaging parameter value table includes a column indicating the coordinates range, a column indicating the imaging parameter values and a column indicating the auxiliary key. The column of the imaging parameter values includes a focus column, a flash column, a color effect column, etc. Then, the imaging parameter value and the auxiliary key are registered in association with the coordinates range indicated in each row.

For example, "AUTO" of the focus, "NO" of the flash and "NEGATIVE" of the color effect are associated with the first coordinates range A1 defined by two primary linear functions of "$Y > a_1 X + b_1$" and "$Y \geq a_2 X + b_2$", and the first auxiliary key 68a is also associated with the first coordinates range A1. Similarly, with the second coordinates range A2 defined by two primary linear functions of "$Y < a_2 X + b_2$" and "$Y \geq a_3 X + b_3$", "MACRO" of the focus, "AUTO" of the flash, "NORMAL" of the color effect are associated, and the second auxiliary key 68b is also associated. Then, with the third coordinates range A3 defined by two primary linear functions of "Y<a₃X+b₃" and "Y≥a₄X+b₄", "DISTANCT" of the focus, "ON" of the flash, "SEPIA" of the color effect are associated, and the third auxiliary key 68c is also associated.

In the above, the features of the embodiment are outlined, but in the following, features will be described in detail with using a memory map shown in FIG. 12 of the RAM 46 of the mobile phone 10 and flowcharts shown in FIGS. 13 to 18 executable by the processor 30 of the mobile phone 10.

Figure 12:
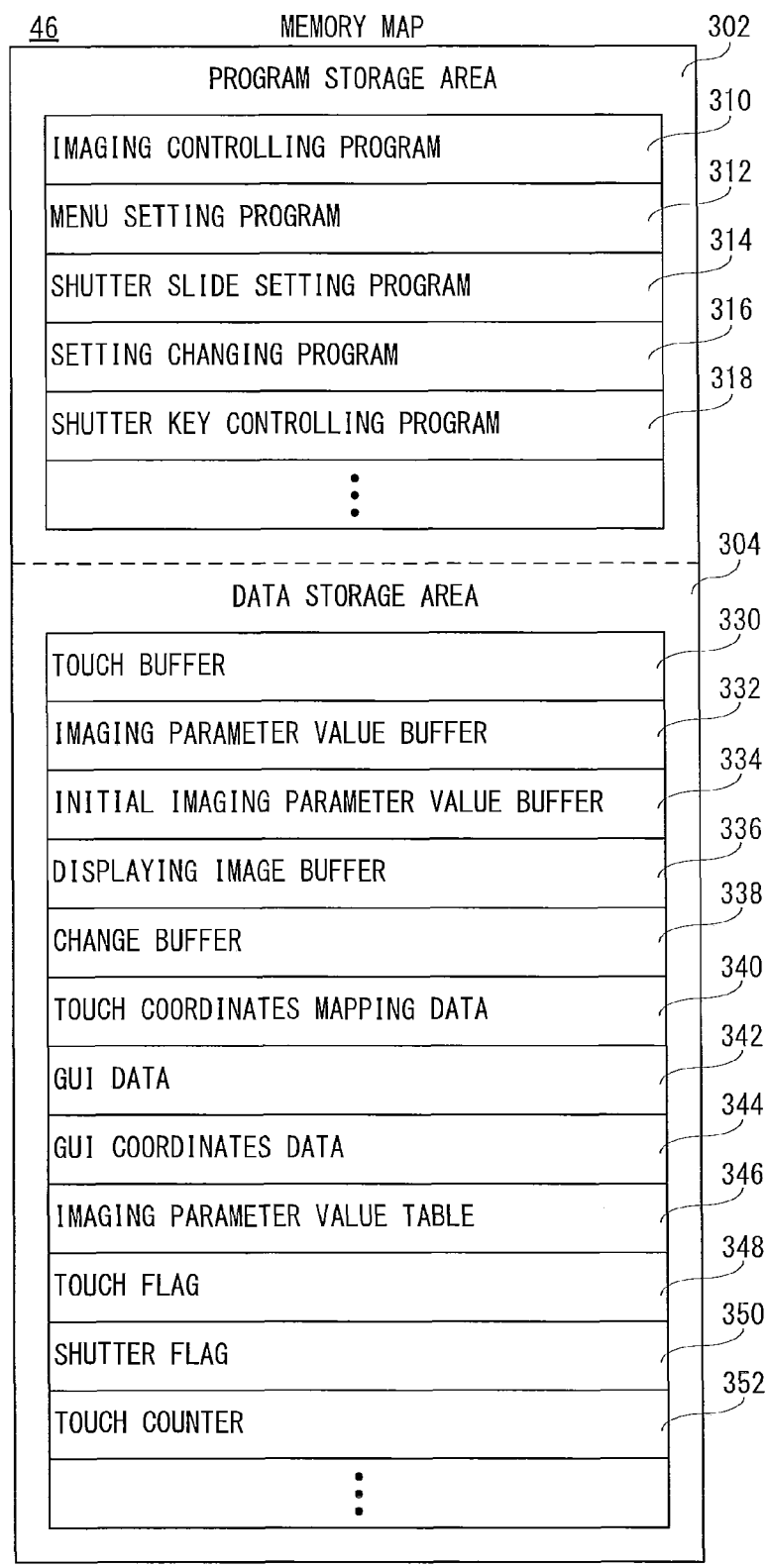
FIG. 12 is an illustrative view showing an example of a memory map of the RAM shown in FIG. 2.

With referring to FIG. 12, in the RAM 46 shown in FIG. 2, a program storage area 302 and a data storage area 304 are formed. The program storage area 302 is, as described above, an area for storing (developing) a part or whole of the program data set in advance in the flash memory 44 (FIG. 2) by reading-out the same.

The program storage area 302 is stored with an imaging controlling program 310, a menu setting program 312, a shutter slide setting program 314, a setting changing program 316, a shutter key controlling program 318, etc. The imaging controlling program 310 is a program for controlling an operation with respect to the menu key 64 and the shutter key 66 at a time that the camera function is being performed. The menu setting program 312 is a program executed at a time that the menu screen is being displayed. The shutter slide setting program 314 is a program executed at a time that the setting screen is being displayed. The setting changing program 316 is a program executed at a time that the changing screen is being displayed. The shutter key controlling program 318 is a program executed when the shutter key 66 is operated.

In addition, the program storage area 302 is further stored with programs for performing a telephone function.

Next, the data storage area 304 of the RAM 46 is provided with a touch buffer 330, an imaging parameter value buffer 332, an initial imaging parameter value buffer 334, a displaying image buffer 336 and a change buffer 338. Furthermore, the data storage area 304 is stored with touch coordinates mapping data 340, GUI data 342, GUI coordinates data 344 and an imaging parameter value table 346, and provided with a touch flag 348, a shutter flag 350 and a touch counter 352.

The touch buffer 330 is stored with data of the touch coordinates output by the touch panel control circuit 48. The imaging parameter value buffer 332 is temporarily stored with respective imaging parameter values changed by an operation by the user when the camera function is being performed. The initial imaging parameter value buffer 334 is temporarily stored with current imaging parameter value at a time that the imaging parameter value is to be changed by the shutter slide function. The displaying image buffer 336 is temporarily stored with data of an image which is to be displayed as a through image. The change buffer 338 is temporarily stored with a changing content at a time that the imaging parameter value registered in advance is to be changed.

The touch coordinates mapping data 340 is data for mapping the touch coordinates by the touch operation and displaying coordinates for the display 14 with each other. That is, a result of the touch operation performed to the touch panel 14 is reflected to the displaying of the display 14 on the basis of the touch coordinates mapping data 340.

GUI data 342 includes image data and character string data for displaying a key and so on to be displayed on the display 14. The GUI coordinates data 344 includes displaying coordinates data of the GUI being displayed. The imaging parameter value table 346 is a table having structure shown in FIG. 11.

The touch flag 348 is a flag for determining whether or not the touch is performed to the touch panel 16. The touch flag 348 is constituted by a 1-bit register, for example. If the touch flag 348 is turned-on (true), a data value "1" is set in the register. If the touch flag 348 is turned-off (false), a data value "0" is set in the register. In addition, touch flag 348 is changed to on/off based on a signal output by the touch panel control circuit 48.

The shutter flag 350 is a flag showing whether or not the shutter slide function is made effective. Therefore, the shutter flag 350 is turned-on when the shutter slide function is made effective, and turned-off if the shutter slide function is made ineffective. Furthermore, the structure of the shutter flag 350 is substantially the same or similar to the touch flag 348, and accordingly, a detailed description of the structure is omitted here.

The touch counter 352 is a counter for measuring a time after the shutter key 66 is touched, and starts a count (measurement) upon reset. Then, the touch counter 352 stops the count if a predetermined time period (3 seconds, for example) elapses. Therefore, the touch counter 352 may be called as a touch timer.

The data storage area 304 is further stored with image data displayed in the standby state, data of character strings, etc. and provided with counters and flags necessary for the operation of the mobile phone 10.

Figure 13:
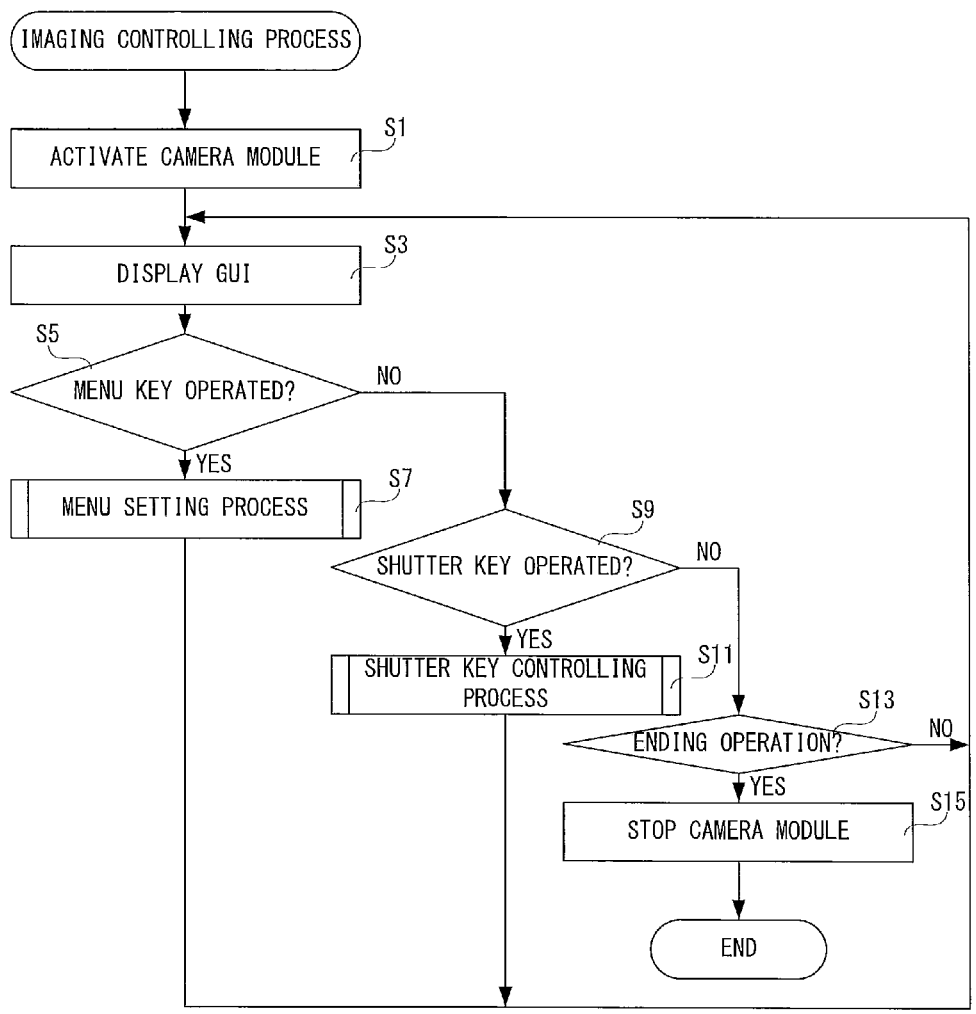
FIG. 13 is a flowchart showing an example of an imaging controlling process by a processor shown in FIG. 2.
Figure 14:
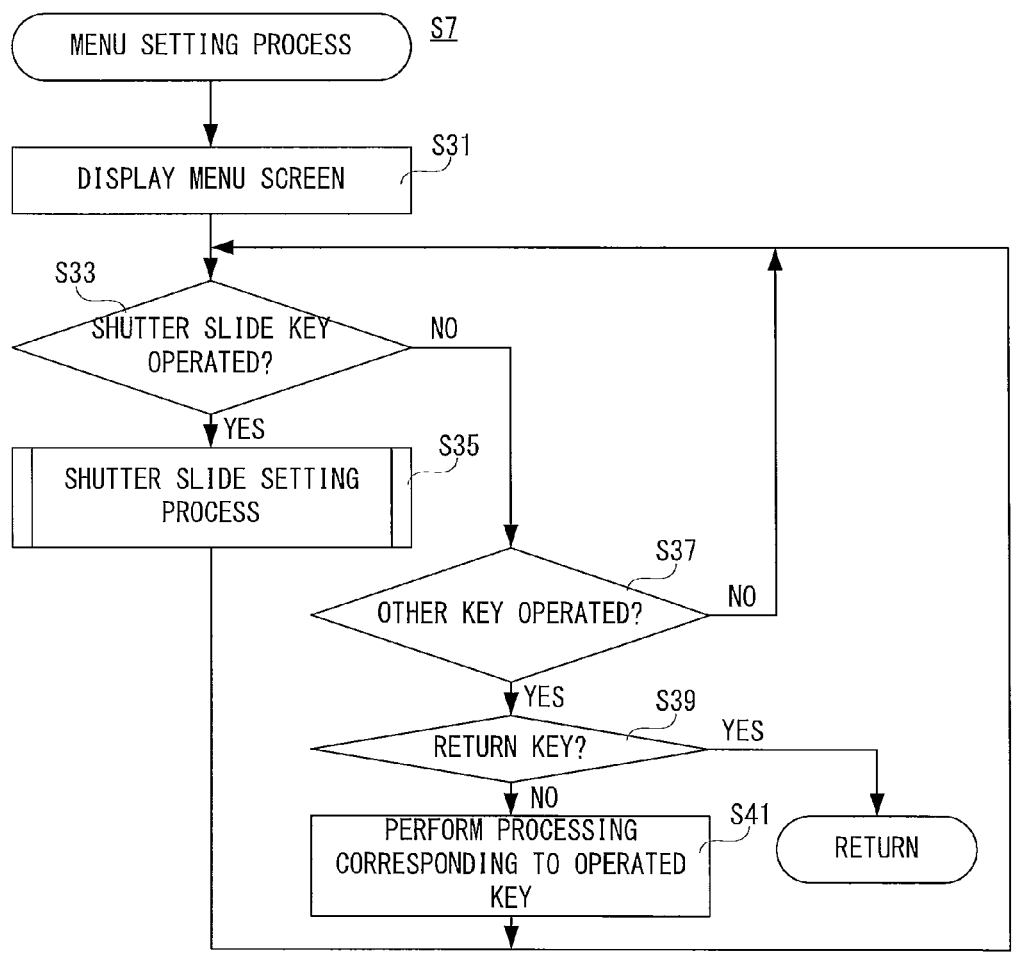
FIG. 14 is a flowchart showing an example of a menu setting processing by the processor shown in FIG. 2.
Figure 15:
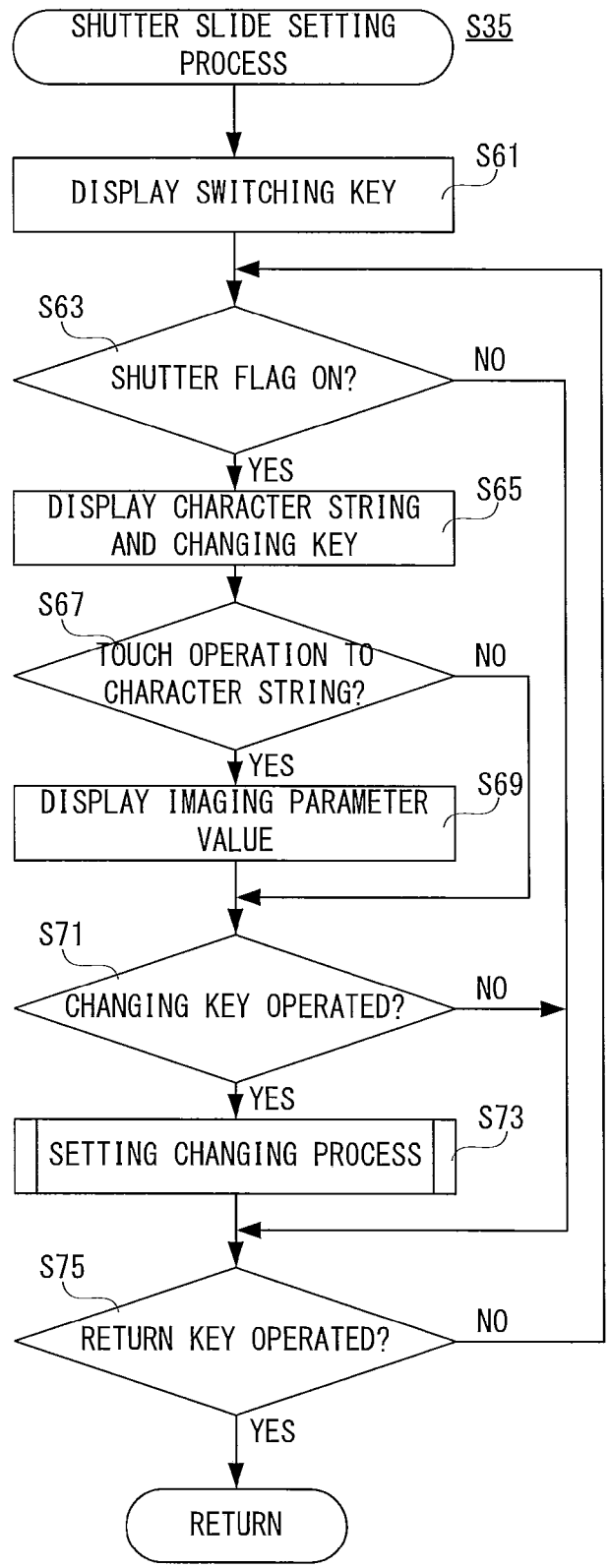
FIG. 15 is a flowchart showing an example of a shutter slide setting process by the processor shown in FIG. 2.
Figure 16:
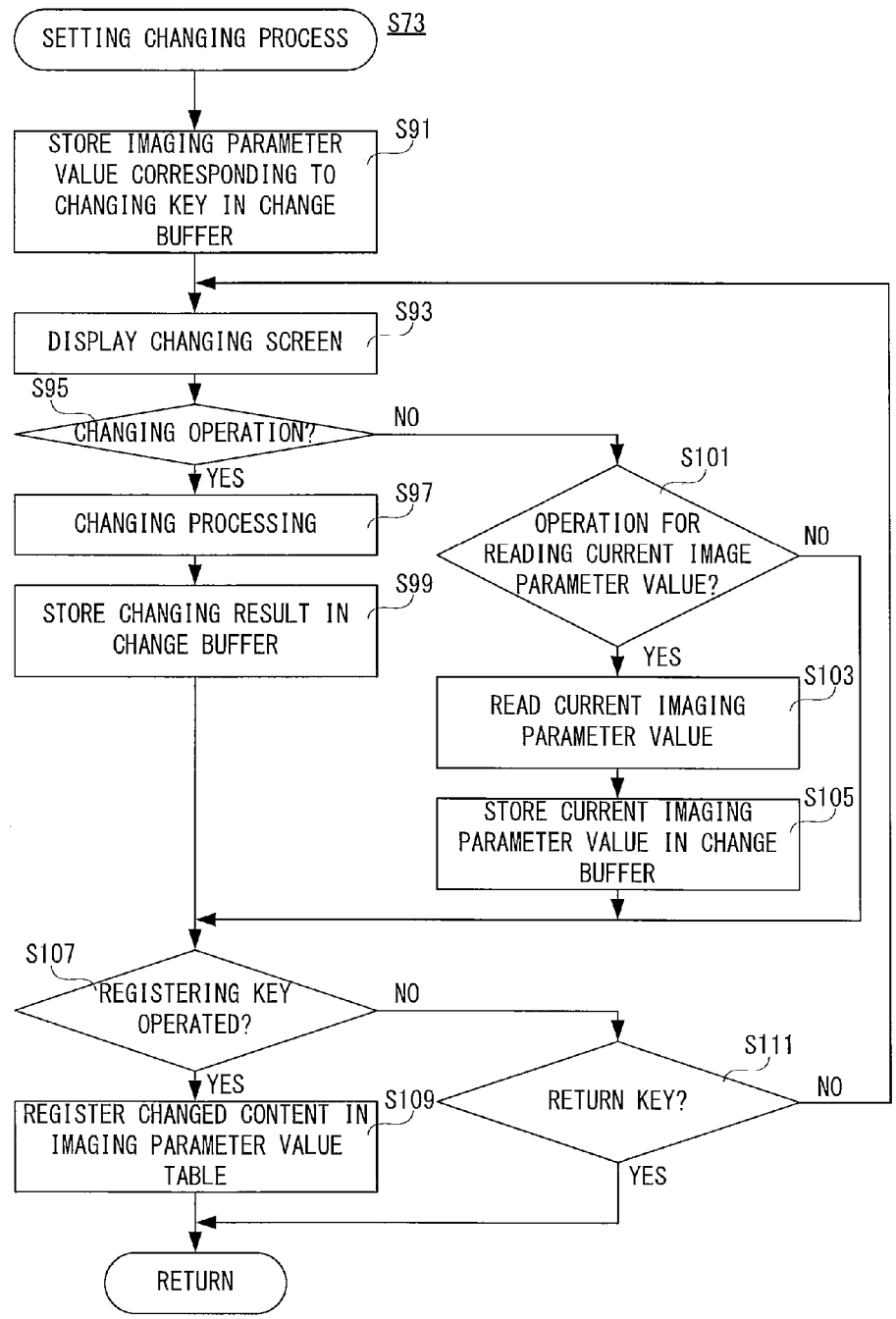
FIG. 16 is a flowchart showing an example of a setting changing processing by the processor shown in FIG. 2.
Figure 17:
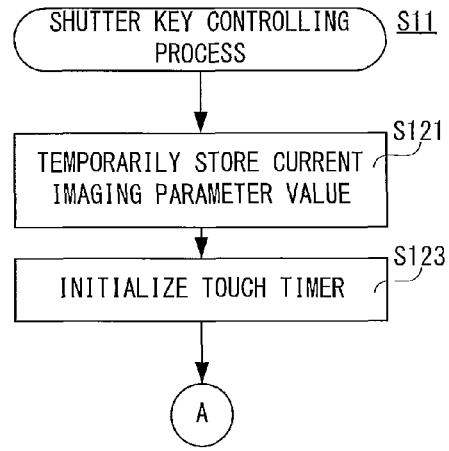
FIG. 17 is a flowchart showing an example of a part of a shutter key controlling processing by the processor shown in FIG. 2.

The processor 30 processes a plurality of tasks including an imaging controlling process shown in FIG. 13, a menu setting process shown in FIG. 14, a shutter slide setting process shown in FIG. 15, a setting changing process shown in FIG. 16 and a shutter key controlling process shown in FIG. 17 and so on in parallel with each other under controls by Linux (registered trademark)-base OS such as Android (registered trademark) and REX or other OSs.

With referring to FIG. 13, an imaging controlling process is started upon an operation for performing the camera function, for example. The processor 30 activates the camera module 50 in a step S1. For example, the processor 30 issues to the control circuit of the camera module 50 an activating instruction. Next, in a step S3, the processor 30 displays a GUI. That is, the processor 30 reads the GUI data 342 and displays on the display 14 images corresponding to the menu key 64 and the shutter key 66. In addition, not only the GUI is displayed but also a through image is displayed on the display 14 based on the image data stored in the displaying image buffer 336. In addition, the processor 30 performing the processing of the step S3 functions as a displaying processing module.

Subsequently, the processor 30 determines whether or not the menu key 64 is operated in a step S5. That is, it is determined whether or not the start coordinates of the touch operation stored in the touch buffer 330 is included in the displaying coordinates region of the menu key 64 stored in the GUI coordinates data 344. If "YES" is determined in the step S5, that is, if the menu key 64 is operated, the processor 30 performs a menu setting process in a step S7, and then, the process by the processor 30 returns to the step S3. In addition, the menu setting process will be described later with using a flowchart in FIG. 14, and therefore, a detailed description thereof is omitted here.

If "NO" is determined in the step S5, that is, if the menu key 64 is not operated, in a step S9, the processor 30 determines whether or not the shutter key 66 is operated. That is, it is determined whether or not the start coordinates of the touch operation stored in the touch buffer 330 is included in the displaying coordinates region of the shutter key 66 stored in the GUI coordinates data 344. If "YES" is determined in the step S9, that is, if the shutter key 66 is operated, the processor 30 performs a shutter key controlling process in a step S11, and the process by the processor 30 returns to the step S3. In addition, because the shutter key controlling process will be described later with using a flowchart in FIG. 17, and a detailed description thereof is omitted here.

If "NO" is determined in the step S9, that is, if the shutter key 66 is not operated, in a step S13, the processor 30 determines whether or not an ending operation is performed. For example, it is determined whether or not the end key 22b is operated for ending the camera function. If "NO" is determined in the step S13, that is, if the ending operation for the camera function is not performed, the process by the processor 30 returns to the step S3. If "YES" is determined in the step S13, that is, if the ending operation of the camera function is performed, in a step S15, the processor 30 stops the camera module 50 to terminate the imaging controlling process.

FIG. 14 is a flowchart of the menu setting process which is started when the step S7 is executed in the imaging controlling process (FIG. 13). In a step S31, the processor 30 displays the menu screen. For example, the processor 30 reads the GUI data 342 so as to display the menu screen including keys for changing the respective imaging parameter values on the display 14.

Next, in a step S33, the processor 30 determines whether or not the shutter slide key 98 is operated. That is, it is determined whether or not the start coordinates stored in the touch buffer 330 is included in the displaying coordinates region of the shutter slide key 98 included in the GUI coordinates data 344. If "YES" is determined in the step S33, that is, if the shutter slide key 98 is operated, the processor 30 performs a shutter slide setting process in a step S35, and then, the process by the processor 30 returns to the step S33. In addition, the shutter slide setting process will be described later with using a flowchart in FIG. 15, and accordingly, a detailed description thereof is omitted here.

On the other hand, if "NO" is determined in the step S33, that is, the shutter slide key 98 is not operated, the processor 30 determines whether or not any other key is operated in a step S37. That is, the processor 30 determines whether or not the start coordinates of the touch operation is included in the displaying coordinates region of the focus key 92 or the like.

If "NO" is determined in the step S37, that is, if the key being displayed is not operated, the process by the processor 30 returns to the step S33. If "YES" is determined in the step S37, that is, if the other key is operated, the processor 30 determines whether or not the return key 90 is operated in a step S39. That is, it is determined whether or not the start coordinates of the touch operation stored in the touch buffer 330 is included in the displaying coordinates region of the return key 90 stored in the GUI coordinates data 344. If "NO" is determined in in the step S39, that is, in a case that the focus key 92 is operated, for example, the processor 30 performs processing corresponding to the key operated in the step S41. That is, if the focus key 92 is operated, a screen for changing the imaging parameter value of the focus is displayed on the display 14.

If "YES" is determined in the step S39, that is, if the return key 90 is operated, the processor 30 terminates the menu setting process and the process by the processor 30 returns to the imaging controlling process. As a result thereof, the displaying of the display 14 returns to a displaying state as in FIG. 3 from the menu screen shown in FIG. 8.

FIG. 15 is a flowchart showing a shutter slide setting process. The shutter slide setting process is started when the step S35 is performed in the menu setting process. The processor 30 displays the switching key 100 in a step S61. If the shutter flag 350 is turned-on, for example, the effective key 100a is displayed. If the shutter flag 350 is turned-off, the ineffective key 100b is displayed.

Subsequently, in a step S63, the processor 30 determines whether or not the shutter flag 350 is turned-on. For example, in the step S63, it is determined whether or not the touch operation is performed to the switching key 100 so as to switch the shutter flag 350. If "NO" is determined in the step S63, that is, if the shutter flag 350 is turned-off, the process by the processor 30 proceeds to a step S75. If "YES" is determined in the step S63, that is, if the shutter flag 350 is turned-on, in a step S65, the character string 102 and the changing key 104 are displayed. For example, the processor 30 reads the GUI data 342 so as to display the character string 102 and the changing key 104 corresponding to the respective coordinates ranges A.

Subsequently, in a step S67, the processor 30 determines whether or not the touch operation is made to the character string 102. That is, it is determined whether or not the start coordinates of the touch operation stored in the touch buffer 330 is included in the displaying coordinates region of the character string 102 stored in the GUI coordinates data 344. If "NO" is determined in the step S67, that is, if the touch operation to the character string 102 is not performed, the process by the processor 30 proceeds to a step S71. If "YES" is determined in the step S67, in a case that the touch operation to the character string 102a is performed, for example, the processor 30 displays the imaging parameter value in a step S69. For example, the processor 30 reads the imaging parameter value corresponding to the character string 102a (the first coordinates range A1) from the imaging parameter value table 346, whereby the read imaging parameter values are displayed on the display 14 as shown in FIG. 9(C).

Next, in a step S71, the processor 30 determines whether or not the changing key 104 is operated. For example, it is determined whether or not any one of the changing keys 104a-104c shown in FIG. 9(B) is touch-operated. If "NO" is determined in the step S71, that is, if the changing key 104 is not operated, the process by the processor 30 proceeds to a step S75. On the other hand, if "YES" is determined in the step S71, for example, if any one of the changing keys 104a-104c is operated, the processor 30 performs a setting changing process in a step S73. In addition, the setting changing process will be described later with using a flowchart in FIG. 16, and therefore, a detailed description thereof is omitted here.

Next, in a step S75, the processor 30 determines whether or not the return key 90 is operated. If "NO" is determined in the step S75, that is, if the return key 90 is not operated, the process by the processor 30 returns to the step S63. If "YES" is determined in the step S75, that is, if the return key 90 is operated, the processor 30 terminates the shutter slide setting process, and then, the process by the processor 30 returns to the menu setting process.

FIG. 16 is a flowchart of a setting changing process that is started if the step S73 is performed in the shutter slide setting process (FIG. 15). The processor 30 stores the imaging parameter values corresponding to the changing keys 104 in the change buffer 338 in a step S91. For example, in a case that the change key 104a is operated, the imaging parameter values corresponding to the first coordinates range A1 are read from the imaging parameter value table 346, and the imaging parameter values are stored in the change buffer 338.

Subsequently, in a step S93, the processor 30 displays a changing screen. For example, the processor 30 reads the GUI data 342 so as to display the changing screen of the first coordinates range on the display 14. Next, the processor 30 determines whether or not a changing operation is performed in a step S95. For example, it is determined whether or not any one of the focus changing key 122, the flash changing key 124 and the color effect changing key 126 shown in FIG. 10(A) is operated. If "YES" is determined in the step S95, that is, if the focus changing key 122 is operated, for example, the processor 30 performs the changing processing in a step S97. For example, as shown in FIG. 10(B), the keys corresponding to the imaging parameter value of the focus are displayed on the display 14, and therefore, it becomes a state that the changing operation of the imaging parameter value can be received. Next, in a step S99, a changing result is stored in the change buffer 338, and the process by the processor 30 proceeds to a step S107. For example, in a case that the touch operation is performed to the "AUTO" key 132, in the change buffer 338, "AUTO" is stored as the imaging parameter value of the focus.

If "NO" is determined in the step S95, that is, if no changing operation is performed, the processor 30 determines in a step S101 whether or not an operation for reading the current imaging parameter value is performed. That is, the processor 30 determines whether or not the reading key 128 is operated. Specifically, it is determined whether or not the start coordinates of the touch operation stored in the touch buffer 330 is included in the displaying coordinates region of the reading key 128 stored in the GUI coordinates data 344. If "NO" is determined in the step S101, that is, the reading key 128 is not operated, the process by the processor 30 proceeds to a step S107.

If "YES" is determined in the step S101, that is, if the reading key 128 is operated, the processor 30 reads the current imaging parameter value in a step S103, and in a step S105, stores the current imaging parameter value in the change buffer 338. That is, the imaging parameter value is read from the imaging parameter value buffer 332 and the read imaging parameter value is stored in the change buffer 338. In addition, the processor 30 performing the processing of the step S103 functions as a reading module.

In a step S107, the processor 30 determines whether or not the registering key 110 is operated. That is, it is determined that the start coordinates of the touch operation stored in the touch buffer 330 is included in the displaying coordinates region of the registering key 110 stored in the GUI coordinates data 344. If "YES" is determined in the step S107, that is, if the registering key 110 is touch-operated, in a step S109, the processor 30 registers the changing content in the imaging parameter value table. That is, the imaging parameter value stored in the change buffer 338 is registered in the imaging parameter value table 346. In addition, if the processing of the step S109 is ended, the processor 30 terminates the setting changing process and the process by the processor 30 returns to the shutter slide setting process. In addition, the processor 30 performing the processing of the step S109 functions as a registering module.

If "NO" is determined in the step S107, that is, if the registering key 110 is not operated, in a step S111, the processor 30 determines whether or not the return key 90 is operated. If "NO" is determined in the step S111, that is, if the return key 90 is not operated, the process by the processor 30 returns to the step S93. If "YES" is determined in the step S111, that is, if the return key 90 is operated, the processor 30 terminates the setting changing process, and then, the process by the processor 30 returns to the shutter slide setting process.

FIG. 17 is a flowchart of a shutter key controlling process that is started when the step S11 is performed in the imaging controlling process (FIG. 13). In a step S121, the processor 30 temporarily stores the current imaging parameter value, that is, the imaging parameter value stored in the imaging parameter value buffer 332 is stored in the initial imaging parameter value buffer 334. Next, the touch timer is initialized in a step S123. That is, the processor 30 resets the touch counter 352 so as to start the measurement of a time that the shutter key 66 is being touched.

Subsequently, in a step S125, the processor 30 determines whether or not the touch timer expires. That is, it is determined whether or not the predetermined time period elapses after the shutter key 66 is touched. If "YES" is determined in the step S125, that is, if the predetermined time period elapses after the shutter key 66 is touched, the processor 30 displays the auxiliary key 68 in a step S127, and then, the process by the processor 30 proceeds to a step S129. In addition, the processor 30 performing the processing of the step S127 functions as an auxiliary key displaying module.

On the other hand, if "NO" is determined in the step S125, that is, if the predetermined time period does not elapse after the shutter key 66 is touched, in the step S129, the processor 30 determines whether or not the touch position is changed. That is, it is determined whether or not the current touch coordinates stored in the touch buffer 330 is changed from those of the previous time. If "NO" is determined in the step S129, that is, if the touch position is not changed, the process by the processor 30 proceeds to a step S137. If "YES" is determined in the step S129, for example, if the finger of the user is slid and thus the touch position is changed, the processor 30 reads the touch coordinates in a step S131. That is, the touch coordinates indicative of the current touch position is read from the touch buffer 330. Next, in a step S133, the processor 30 determines whether or not the touch position is included in the coordinates range. For example, the processor 30 reads the respective coordinates ranges A from the imaging parameter value table 346 and determines whether or not the touch coordinates indicative of the current touch position is included in the read coordinates ranges A. In addition, the processor 30 performing the processing of the step S133 functions as a determining module.

If "NO" is determined in the step S133, that is, the touch coordinates is not included in the coordinates range A, the process by the processor 30 proceeds to a step S145. If "YES" is determined in the step S133, that is, if the touch coordinates is included in the first coordinates range A1, for example, the processor 30 changes the imaging parameter value in a step S135. For example, the imaging parameter values corresponding to the first coordinates range A1 are read from the imaging parameter value table 346 and the read imaging parameter values are stored in the imaging parameter value buffer 332. In addition, the processor 30 performing the processing of the step S135 functions as a changing module.

Subsequently, the processor 30 determines whether or not the finger is released in a step S137. For example, it is determined whether or not the finger of the user having been touched to the shutter key 66 is released from the touch panel 16. Specifically, the processor 30 determines whether or not the touch flag 348 is turned-off. If "NO" is determined in the step S137, that is, if the finger of the user is not released, the process by the processor 30 returns to the step S125.

On the other hand, if "YES" is determined in the step S137, that is, if the finger of the user is released, in a step S139, the processor 30 performs an imaging process. If the imaging process is performed, for example, an image stored in the displaying image buffer 336 is transferred to a further buffer upon the release. At the same time, the pop-up 80 (FIG. 7) for confirming to the user whether or not the image is to be saved is displayed on the display 14. Then, if the user operates to save the image, the imaged image is saved in the flash memory 44. In addition, the processor 30 performing the processing of the step S139 functions as a saving module.

Subsequently, in a step S141, the processor 30 determines whether or not the imaging parameter value is changed. That is, it is determined whether or not the end position of the touch operation is included in the coordinates range A. If "YES" is determined in the step S141, that is, if the imaging parameter value is changed, the processor 30 undoes the imaging parameter value in a step S143, and terminates the shutter key controlling process, and the process by the processor 30 returns to the imaging controlling process. That is, the imaging parameter value stored in the initial imaging parameter value buffer 334 is stored in the imaging parameter value buffer 332. If "NO" is determined in the step S141, that is, if the finger is released from the shutter key 66 while the imaging parameter value is not changed, the processor 30 terminates the shutter key controlling process, and the process by the processor 30 returns to the imaging controlling process.

Here, if the touch position is not included in the coordinates range A, that is, if "NO" is determined in the step S133, in a step S145, the processor 30 determines whether or not the finger is released. That is, the processor 30 determines whether or not the finger is released out of the coordinates range A. If "NO" is determined in the step S145, that is, the finger is not released, the process by the processor 30 returns to the step S125.

If "YES" is determined in the step S145, that is, the finger is released out of the coordinates range A, in a step S147, the processor 30 determines whether or not the finger is released within the shutter key 66. That is, the processor 30 determines whether or not the end position of the touch operation is included in the displaying coordinates region of the shutter key 66. If "YES" is determined in the step S147, that is, if the finger is released within the displaying range of the shutter key 66, as similar to the step S139, the processor 30 performs the imaging process in a step S149. Then, if the imaging process is ended in the step S149, the processor 30 terminates the shutter key controlling process. In addition, the processor 30 performing the processing of the step S149 functions as a saving module.

Furthermore, if "NO" is determined in the step S147, that is, if the released position is not within the displaying coordinates region of the shutter key 66 or the coordinates range A, the shutter key controlling process is terminated without performing the imaging process, and the process by the processor 30 returns to the imaging controlling process.

In addition, although not shown in the shutter key controlling process, in a case that the imaging parameter value is set in the step S135, a through image according to the set imaging parameter value is displayed on the display 14. Then, in a case that the finger of the user is not released and thus the touch position is changed such that the touch position is moved from a given coordinates range A to another coordinates range A, the through image to be displayed on the display 14 is changed. That is, at every time that the imaging parameter value according to the coordinates range A is changed, the through image to be displayed on the display 14 is also changed.

Furthermore, in a case that the touch position is included in an arbitrary coordinates range A, there is a possibility that the touch position of the finger shakes. Therefore, in other embodiments, a boundary line by which it is determined that the touch position exceeds the coordinates range A wherein the touch position is included (being touched) may be provided outer than the coordinates range A. In such a case, if the touch position comes out of the coordinates range A, it can be determined that the touch position does not come out the coordinates range A as far as the touch position does not exceed the boundary line provided outer than the coordinates range A. However, in such a case, if the predetermined time period elapses, it may be determined that the touch position comes out of the coordinates range A.

In addition, in other embodiments, the above-described shake of the finger may be handled by performing a confirming process when it is determined that the touch position comes out of the coordinates range A. For example, if the touch position comes out of the coordinates range A, a timer of a predetermined time period (0.5 seconds, for example) is activated, and if the touch position after the predetermined time period is out of the coordinates range A, it is determined that "the touch position comes out of the coordinates range A". On the other hand, if the touch position after the predetermined time period is within the inside of the coordinates range A, it is determined that "the touch position does not come out of the coordinates range A".

Figure 19:
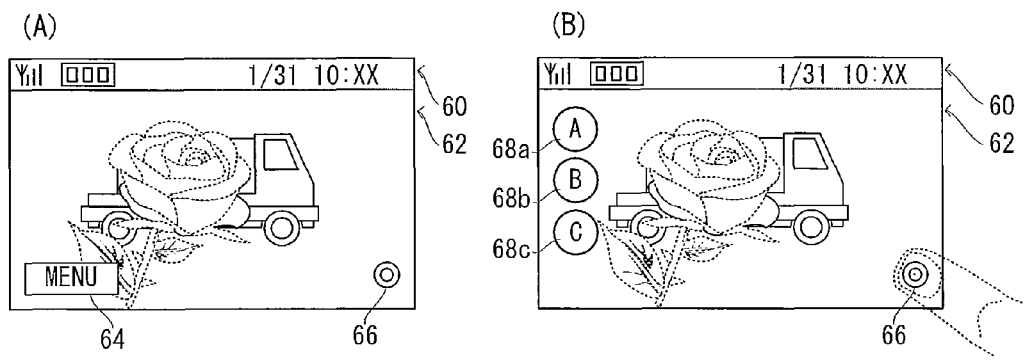
FIG. 19 is an illustrative view showing a still another example of a through image displayed on the display shown in FIG. 1.

Here, the auxiliary key 68 may be arranged at a further position. With referring to FIGS. 19(A) and 19(B), for example, if the touch operation is performed with respect to the shutter key 66, the first auxiliary key 68a to the third auxiliary key 68c may be arranged at a left side of the display 14. In such a case, the user can change the imaging parameter value and perform the imaging process by making the touch operation to the auxiliary keys 68 at the left side while the shutter key 66 at a right side is being touched.

Figure 20:
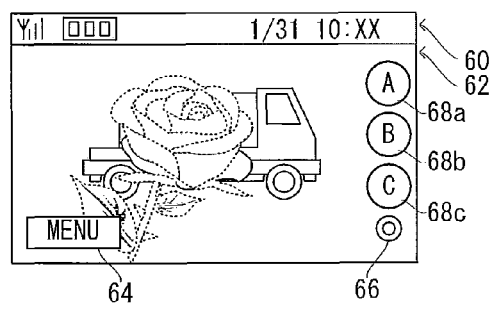
FIG. 20 is an illustrative view showing the other example of a through image displayed on the display shown in FIG. 1.
Figure 18:
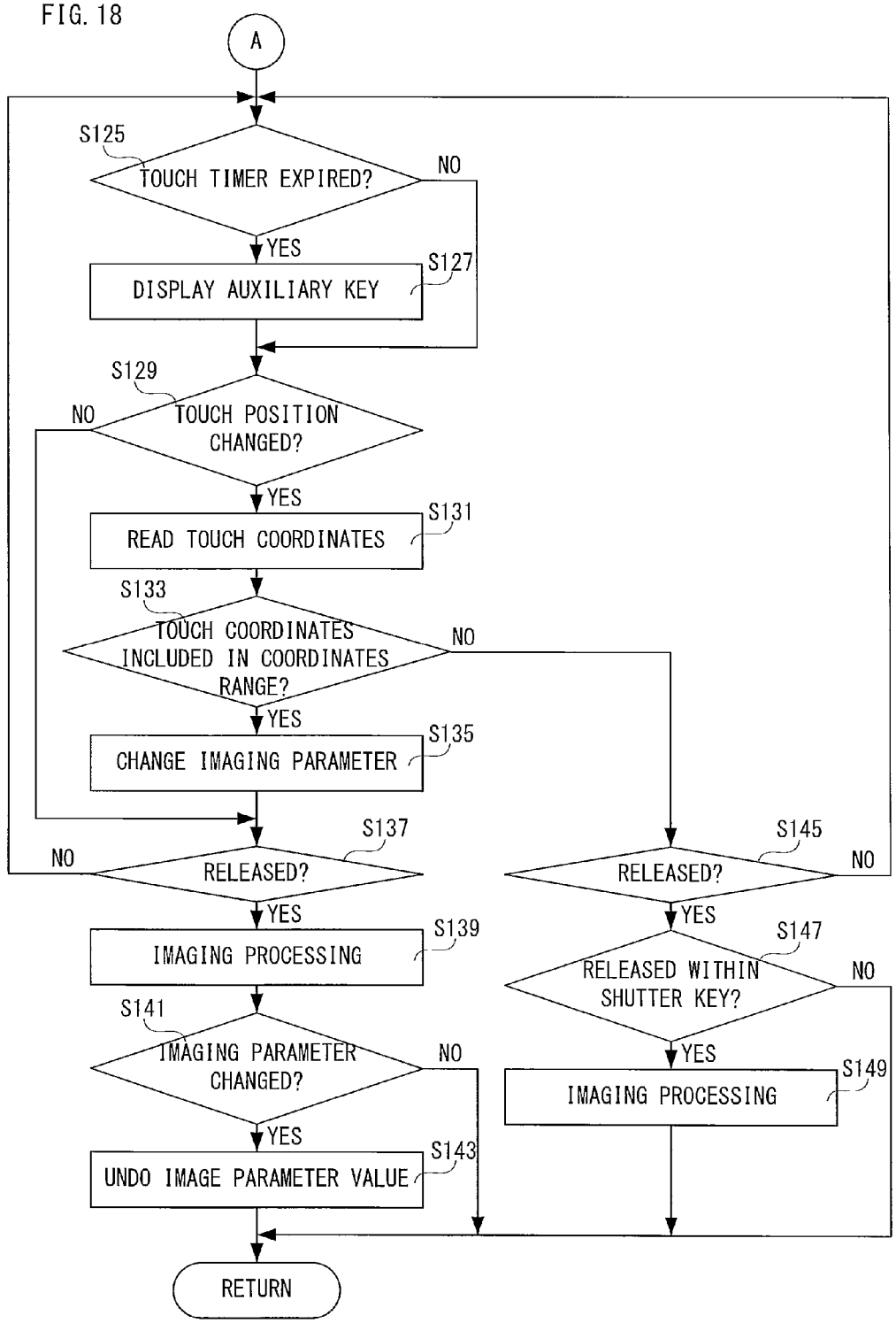
FIG. 18 is a flowchart showing another part of the shutter key controlling processing by the processor shown in FIG. 2, following FIG. 17.

Furthermore, with referring to FIG. 20, in the initial state, the shutter key 66 and the first auxiliary key 68a to the third auxiliary key 68c may be displayed in an aligned manner. In such a case, if the touch operation is performed to an arbitrary auxiliary key 68, the imaging parameter value is changed and the imaging process is performed. Furthermore, if the touch operation is performed to the shutter key 66, the imaging process is performed without changing the imaging parameter value.

In addition, in other embodiments, a predetermined condition for changing the imaging parameter value may be a condition relating to the slide direction, but not a condition relating to coordinates range A. The condition relating to the slide direction is, for example, whether or not a direction from an initial position of the shutter key 66 to the touch operation is coincident with or approximately coincident with one of a plurality of registered sliding directions. The initial position of the shutter key 66 is the position of the shutter key 66 displayed with a through image on the display 14 (see FIG. 4(A), for example). Here, the sliding direction may be associated with the angle range with respect to the horizontal direction. In a case that the predetermined condition is a condition relating to the slide direction, for example, an angle range with respect to the horizontal direction and the imaging parameter value are registered with being associated with each other in the imaging parameter value table. Furthermore, if a flick operation is made, the angle with respect to the horizontal direction can be calculated based on the start coordinates and the end coordinates of the flick operation. Then, if the calculated angle is included in the above-described angle range, the imaging parameter value is changed and the imaging process is performed.

In addition, in a case that the predetermined condition is a condition whether or not the direction of the touch operation is coincident with or approximately coincident with the sliding direction, by combining a plurality of times of the sliding operations, the imaging parameter value may be changed. For example, a kind of the imaging parameter value to be changed is selected by a first-time sliding operation, and according to a second-time sliding operation, a content to be changed is decided.

The imaging parameter values may include imaging parameter values of a contrast, an exposure, a zoom, a quality (compression rate), etc.

Furthermore, the above-described parameter values may be changed in stages by successively changing the touch position.

In addition, in a case that a plurality of parameter values exist, by performing the slide operation in different area shown in FIG. 5, different parameter values can be individually changed. For example, when the slide direction is changed in the area A3 in FIG. 5, only the contrast can be changed, and when the slide direction is changed in the area A2, only the zoom can be changed, and so forth.

In addition, a plurality of imaging parameter values may be collectively called as "imaging mode", and the user can change the imaging mode in accordance with an imaging scene. In this case, the user can register a predetermined imaging mode and a predetermined condition in advance, and performing the touch operation satisfying the predetermined condition, the imaging mode can be changed.

Programs utilized in the above-described embodiments may be stored in an HDD of the server for data distribution, and distributed to the mobile phone 10 via the network. The plurality of programs may be stored in a storage medium such as an optical disk of CD, DVD, BD (Blu-ray Disc) or the like, a USB memory, a memory card, etc. and then, such the storage medium may be sold or distributed. In a case that the plurality of programs downloaded via the above-described server or storage medium are installed to a mobile terminal having the structure equal to the structure of the embodiment, it is possible to obtain advantages equal to advantages according to the embodiment.

The specific numerical values mentioned in this specification are only examples, and changeable properly in accordance with the change of product specifications.

It is to be noted that an inside of the parentheses and the supplements show an example of a corresponding relationship with the embodiments for easy understanding of the present invention, and do not limit the present invention.

An embodiment is a mobile terminal which has a camera module and in which a first imaging parameter value is set prior to imaging, comprising: a display module; a touch panel provided on the display module; a detecting module which detects a touch operation to the touch panel; a storing module which stores a condition of the touch operation in correspondence to at least one second imaging parameter value being registered in advance; a displaying processing module which displays an imaging key on the display module; a determining module which determines, when a touch operation is performed to the imaging key, whether or not the touch operation satisfies the condition; a changing module which changes the first imaging parameter value to the second imaging parameter value when it is determined that the touch operation to the imaging key satisfies the condition; and a saving module which saves an image imaged based on the second imaging parameter value by the camera module when the touch operation to the imaging key is ended.

In the embodiment, a mobile terminal (10: reference numeral exemplifying a module corresponding in the embodiment, and so forth) has the camera module (50) and the display module (14) such as a display. An image output from the camera module, for example, is displayed on the display module based on a first imaging parameter value. The touch panel (16) functioning as a pointing device is provided on the display module, and a touch operation to the touch panel is detected by a detecting module (48) including a control circuit, etc. The storing module (46) including a memory, etc., stores a condition of the touch operation in correspondence to a second imaging parameter value registered in advance by a user or the like. The displaying processing module (30, S$_3$) displays an imaging key (66) on the display module if and when the camera function is performed. If the touch operation is made to the imaging key, the determining module (30, S133) determines whether or not the touch operation satisfies the above-described condition. The changing module (30, S135) changes the first imaging parameter value to the second imaging parameter value if and when it is determined by the determining module that the touch operation satisfies the above-described condition. The saving module (30, S139) saves an image imaged based on the second imaging parameter value being changed if the finger of the user is released from the imaging key, and thus the touch operation is ended.

According to the embodiment, the user can easily change the imaging parameter value and perform an imaging only by performing the predetermined touch operation at a time of imaging. Therefore, the operability is increased at a time of imaging.

In another embodiment, the condition includes a condition whether or not a touch position of the touch operation is included in a coordinates range, and the determining module determines, when the imaging key is touched, whether or not the touch position of a succeeding touch operation is included in the coordinates range.

In this embodiment, the coordinates range (A) is brought into correspondence to the second imaging parameter value. The determining module determines whether or not the touch position during a time that the touch operation is being performed is included in the coordinates range if and when the imaging key is touched.

According to the embodiment, the user can easily select the imaging parameter value only by moving the touch position to the coordinates range.

A yet another embodiment comprises an auxiliary key displaying module which displays an auxiliary key corresponding to the condition.

In this embodiment, the auxiliary key displaying module (30, S127) displays the auxiliary key in order to lead the touch operation satisfying the condition.

According to the embodiment, it becomes easy for the user to change the imaging parameter value by referring to the displaying of the auxiliary key.

In a further embodiment, the auxiliary key displaying module displays an auxiliary key corresponding to the coordinates range when a predetermined time period elapses after the imaging key is touched.

In the further embodiment, the auxiliary key is displayed when a predetermined time period (3 seconds, for example) elapses after the touch to the imaging key is performed.

According to the further embodiment, due to the displaying of the auxiliary key, the coordinates range becomes easy to be grasped.

A still further embodiment further comprises a registering module which registers at least one of the second imaging parameter value in the storing module.

In the still further embodiment, the registering module (30, S109) registers at least one of the second imaging parameter value in the storing module in response to an operation by the user, for example.

According to the still further embodiment, the user can arbitrarily register an imaging parameter value.

A yet still further embodiment further comprises a reading module which reads a current first imaging parameter value, and the registering module registers the current first imaging parameter value read by the reading module to the storing module as the second imaging parameter value.

In this embodiment, the reading module (30, S103) reads the current first imaging parameter value set by the user, for example. The registering module registers the first imaging parameter value read by the reading module as the second imaging parameter value.

According to this embodiment, the user can easily register the imaging parameter value that the user utilizes until just before.

A further embodiment is an imaging key control method in a mobile terminal (10) in which a first imaging parameter value is set prior to imaging and which has a camera module (50), a display module (14), a touch panel (16) provided on the display module, a detecting module (48) which detects a touch operation to the touch panel and a storing module (46) which stores a condition of the touch operation in correspondence to at least one second imaging parameter value being registered in advance, comprising steps of: displaying (S3) an imaging key on the display module; determining (S133), when a touch operation is performed to the imaging key, whether or not the touch operation satisfies the condition; changing (S135) the first imaging parameter value to the second imaging parameter value when it is determined that the touch operation to the imaging key satisfies the condition; and saving (S139) an image imaged based on the second imaging parameter value by the camera module when the touch operation to the imaging key is ended.

According to the further embodiment, the user can easily change the imaging parameter value and perform an imaging only by performing the predetermined touch operation at a time of imaging. Therefore, the operability is increased at a time of imaging.

A still further embodiment is a mobile terminal which has a camera module and in which a first imaging parameter value is set prior to imaging, comprising: a display module operable to display an imaging key; a touch accepting module provided on the display module; a detecting module operable to detect a touch operation to the touch accepting module; a storing module operable to store a condition of the touch operation in correspondence to at least a second imaging parameter value; and a changing module operable to change the first imaging parameter value when the touch operation to the touch operation to the imaging key satisfies the condition.

In a yet further embodiment, the condition includes a condition whether or not, when the touch position changes after the imaging key is touched, a changed touch position is included in a coordinates range.

The other embodiment is a non-transitory computer readable storage medium which stores an imaging key controlling program executable by a processor (30) in a mobile terminal (10) in which a first imaging parameter value is set prior to imaging and which includes a camera module (50), a display module (14), a touch panel (16) provided on the display module, a detecting module (48) which detects a touch operation to the touch panel and a storing module (46) which stores a condition of the touch operation in correspondence to at least one second imaging parameter value being registered in advance, wherein the imaging key controlling program causes the processor to function as: a displaying processing module (S3) which displays an imaging key on the display module; a determining module (S133) which determines, when a touch operation is performed to the imaging key, whether or not the touch operation satisfies the condition; a changing module (S135) which changes the first imaging parameter value to the second imaging parameter value when it is determined that the touch operation to the imaging key satisfies the condition; and a saving module (S139) which saves an image imaged based on the second imaging parameter value by the camera module when the touch operation to the imaging key is ended.

According to the other embodiment, the user can easily change the imaging parameter value and perform an imaging only by performing the predetermined touch operation at a time of imaging. Therefore, the operability is increased at a time of imaging.

Although the present invention has been described and illustrated in detail, it is clearly understood that the same is by way of illustration and example only and is not to be taken by way of limitation, the spirit and scope of the present invention being limited only by the terms of the appended claim.

What is claimed is:

1. A mobile terminal which has a camera module and in which at least one first imaging parameter value is set prior to imaging, the mobile terminal comprising:
a display;
a touch panel provided on the display; and
one or more modules that
detect a touch operation to the touch panel,
store one or more ranges for the touch operation, wherein each of the one or more ranges correspond to at least one second imaging parameter value registered in advance,
display an imaging key on the display, and,
when a touch operation is performed to the imaging key for a predetermined period of time,
display one or more representations of the one or more ranges around the imaging key,
determine where the touch operation is ended,
when it is determined that the touch operation is ended at one of the one or more displayed representations of the one or more ranges, change the at least one first imaging parameter value to the at least one second imaging parameter value corresponding to the range represented by the one representation, and save an image imaged by the camera module based on the at least one second imaging parameter value corresponding to the range represented by the one representation, and,
when it is determined that the touch operation is ended at the imaging key while the one or more displayed representations of the one or more ranges are displayed around the imaging key, save an image imaged by the camera module based on the at least one first imaging parameter value.

2. A mobile terminal according to claim 1, wherein each of the one or more displayed representations of the one or more ranges comprises an auxiliary key.

3. A mobile terminal according to claim 1, wherein the one or more modules register at least one second imaging parameter value in a memory.

4. A mobile terminal according to claim 3, wherein the one or more modules read a current first imaging parameter value, and register the current first imaging parameter value in the memory as the second imaging parameter value.

5. A mobile terminal according to claim 1, wherein each of the one or more ranges correspond to an imaging mode comprising a plurality of second imaging parameter values, wherein changing the at least one first imaging parameter value to the at least one second imaging parameter value comprises changing a first imaging mode, comprising a plurality of first imaging parameter values, to a second imaging mode, comprising a plurality of second imaging parameter values, and wherein saving an image imaged by the camera module based on the at least one second imaging parameter corresponding to the range comprises saving an image imaged based on the second imaging mode corresponding to the range.

6. A mobile terminal according to claim 5, wherein the one or more modules provide a user interface configured to receive, from a user, one or more inputs defining one or more of a plurality of imaging parameter values for each of a plurality of imaging modes, including the first imaging mode and the second imaging mode.

7. A mobile terminal according to claim 6, wherein the plurality of imaging parameter values for one or more of the plurality of imaging modes comprise a focus parameter value, a flash parameter value, and a color-effect parameter value.

8. A mobile terminal according to claim 1, wherein each of the one or more ranges is a predetermined angle range from the imaging key.

9. A mobile terminal according to claim 1, wherein the touch operation is a flick.

10. A mobile terminal according to claim 1, wherein the one or more modules, when the touch operation is performed to the imaging key for less than the predetermined period of time, without displaying any representations of the one or more ranges:
   determine whether the touch operation is ended within one of the one or more ranges,
   when it is determined that the touch operation is ended at one of the one or more ranges, change the at least one first imaging parameter value to the at least one second imaging parameter value corresponding to the one range, and save an image imaged by the camera module based on the at least one second imaging parameter value corresponding to the one range, and,
   when it is determined that the touch operation is ended at the imaging key, save an image imaged by the camera module based on the at least one first imaging parameter value.

11. An imaging key control method in a mobile terminal in which at least one first imaging parameter value is set prior to imaging and which has a camera module, a display, a touch panel provided on the display, a detecting module which detects a touch operation to the touch panel, and a storing module which stores a one or more ranges for the touch operation, wherein each of the one or more ranges correspond to at least one second imaging parameter value registered in advance, the method comprising:
   displaying an imaging key on the display; and,
   when a touch operation is performed to the imaging key for a predetermined period of time,
   displaying one or more representations of the one or more ranges around the imaging key,
   determining where the touch operation is ended;
   when it is determined that the touch operation is ended at one of the one or more ranges, changing the at least one first imaging parameter value to the at least one second imaging parameter value corresponding to the range represented by the one representation, and saving an image imaged by the camera module based on the at least one second imaging parameter value corresponding to the range represented by the one representation, and,
   when it is determined that the touch operation is ended at the imaging key while the one or more displayed representations of the one or more ranges are displayed around the imaging key, saving an image imaged by the camera module based on the at least one first imaging parameter value.

12. A mobile terminal which has a camera module and in which at least one first imaging parameter value is set prior to imaging, the mobile terminal comprising:
   a display operable to display an imaging key;
   a touch acceptor provided on the display; and
   one or more modules that
      detect a touch operation to the touch acceptor;
      store one or more ranges for the touch operation, wherein each of the one or more ranges correspond to at least a second imaging parameter value, and,
      when the touch operation is performed to the imaging key for a predetermined period of time,
         display one or more representations of the one or more ranges around the imaging key,
         determine where the touch operation is ended,
         when it is determined that the touch operation is ended at one of the one or more displayed representations of the one or more ranges, change the at least one first imaging parameter value to the at least one second imaging parameter value corresponding to the range represented by the one representation, and save an image imaged by the camera module based on the at least one second imaging parameter value corresponding to the range represented by the one representation, and
         when it is determined that the touch operation is ended at the imaging key while the one or more displayed representations of the one or more ranges are displayed around the imaging key, save an image imaged by the camera module based on the at least one first imaging parameter value.

* * * * *